United States Patent
Cousson et al.

(10) Patent No.: US 9,016,776 B2
(45) Date of Patent: Apr. 28, 2015

(54) DEVICE FOR CLOSING OFF AN OPENING PROVIDED IN THE ROOF OF A MOTOR VEHICLE AND WHICH IS CAPABLE OF BEING PLACED IN A PARTIALLY CLOSED OFF POSITION

(75) Inventors: Francois Cousson, La Chapelle Saint-Laurent (FR); Daniel Martineau, Saint-Mesmin (FR)

(73) Assignee: Advanced Comfort Systems France SAS-ACS France, Bressuire Cedex (FR)

( * ) Notice: Subject to any disclaimer, the term of this patent is extended or adjusted under 35 U.S.C. 154(b) by 0 days.

(21) Appl. No.: 13/813,290

(22) PCT Filed: Jul. 29, 2011

(86) PCT No.: PCT/EP2011/063168
§ 371 (c)(1), (2), (4) Date: Mar. 19, 2013

(87) PCT Pub. No.: WO2012/013815
PCT Pub. Date: Feb. 2, 2012

(65) Prior Publication Data
US 2013/0169007 A1    Jul. 4, 2013

(30) Foreign Application Priority Data

Jul. 30, 2010 (FR) .................................... 10 56344
Mar. 3, 2011 (FR) .................................... 11 51726

(51) Int. Cl.
*B60J 7/05* (2006.01)
*B60J 7/02* (2006.01)
(Continued)

(52) U.S. Cl.
CPC .... *B60J 7/02* (2013.01); *B60J 1/14* (2013.01); *B60J 1/16* (2013.01); *B60J 7/024* (2013.01); *B60J 7/05* (2013.01); *B60J 7/0084* (2013.01); *B60J 7/08* (2013.01)

(58) Field of Classification Search
CPC .............. B60J 7/043; B60J 7/053; B60J 7/05; B60J 7/057; B60J 7/0573; B60J 7/0084; B60J 7/028
USPC .............................. 296/216.01–224, 213, 214
See application file for complete search history.

(56) References Cited

U.S. PATENT DOCUMENTS

| 4,417,763 | A | 11/1983 | Schlapp et al. |
| 4,732,422 | A * | 3/1988 | Schlapp et al. ............... 296/221 |
| 7,077,462 | B1 | 7/2006 | Gaillard |
| 2010/0084894 | A1* | 4/2010 | Billy et al. .................... 296/221 |

FOREIGN PATENT DOCUMENTS

| DE | 3205445 | 8/1983 |
| EP | 1974968 | 10/2008 |

(Continued)

*Primary Examiner* — Dennis H Pedder
(74) *Attorney, Agent, or Firm* — Hamre, Schumann, Mueller & Larson, P.C.

(57) ABSTRACT

The invention relates to a device for closing off an opening provided in the body of a motor vehicle, including: a stationary glass portion PF to be rigidly connected to said vehicle, and a movable glass panel PM capable of moving, relative to the stationary portion PF, between a closed position, in which the glass panel closes off an opening OUV provide in said stationary portion PF, and at least one open position, in which said opening OUV is at least partially uncovered. According to the invention, the movable panel PM is mounted on a movable frame CM that is provided with tilting means for tilting the movable panel PM relative to said movable frame CM. The invention enables the use of more compact tilting means than those used in the prior art.

7 Claims, 7 Drawing Sheets

(56) References Cited

FOREIGN PATENT DOCUMENTS

| FR | 2483338 | 12/1981 |
| WO | WO 01/94141 | 12/2001 |
| WO | WO 2004/089672 | 10/2004 |

\* cited by examiner

DEVICE FOR CLOSING OFF AN OPENING PROVIDED IN THE ROOF OF A MOTOR VEHICLE AND WHICH IS CAPABLE OF BEING PLACED IN A PARTIALLY CLOSED OFF POSITION

1. FIELD OF THE INVENTION

The field of the invention is that of glazed opening or bays for motor vehicles, whether they are side openings or openings that are to form the roofs of vehicles. More specifically, the invention pertains to glazed openings comprising at least one aperture working with a sliding, movable glass panel or glazed panel.

In the framework of the present application, the term "glazed panel" refers to any substantially transparent or translucent (fixed or movable) panel contributing to the window surface allowing light transmission, made out of glass or any other appropriate material such as polycarbonate. The edges of the panel may be opacified, for example by screen printing. In certain embodiments, the panel may be constituted by several flush elements, seen from the exterior, and where applicable at least one of these elements may be opaque and, for example, made of metal.

A device according to the invention can furthermore be fitted into an opening formed in a substantially horizontal portion of the body of the vehicle, other than the roof.

2. PRIOR-ART TECHNIQUES

The current trend for motor vehicles, whether automobiles, utility vehicles, trucks or buses, is to offer increasing amounts of glazed surfaces. Thus, in particular, vehicles have been proposed having a roof equipped with one or more glazed elements. In certain cases, the entire roof is made of glass or of a similar material allowing sunlight to pass through. Solutions have been proposed to make apertures in the roof especially to be able to form a sunroof module.

Thus, one widespread technique for uncovering an aperture in the roof consists in tilting a movable window glass element mounted on a frame towards the exterior of the vehicle around a pin linked to the plane of the roof, in order to release a passage between the window glass element and the frame.

Another sunroof technique, which is also used conventionally, consists in making the window glass movable above or below the roof in a plane substantially parallel to the plane of the roof. There is thus a first known technique for a roof pierced with an opening that can be closed off by a sliding glazed panel housed in the lining of the roof.

Another sunroof technique, which is also widespread, consists in a combination of the above techniques that thus makes it possible to alternately open the roof partially (make it ajar) and totally uncover the aperture by retracting the movable panel.

One drawback of this technique is that, under present conditions, the means enabling the movable panel to be opened partially relative to the fixed portion are mounted on said fixed portion and therefore have a substantial space requirement.

Besides, in the prior-art devices, the movable panel and its frame are fixedly attached to each other so that it is not possible to provide for tight-sealing means to protect the fixed portion from water spray which could come from the exterior when the movable panel is partially open or ajar, since the only means that can be employed in such a case are tight-sealing means between the movable panel and the fixed portion which are inactive when the movable panel is partially open.

To cope with this problem, it has been proposed to equip the contour of the fixed portion with a peripheral water-recovery container in which the water deposited on the surface of the movable window glass is collected.

One drawback of this approach is that the receptacle may get completely filled and in certain cases overflow. The excess water may then flow into the vehicle interior space through the aperture, which of course is unsatisfactory.

Another drawback of this approach is the need for the presence of a water-recovery container which reduces the window surface allowing light transmission and/or the permissible size of the aperture on the exterior and/or the volume of the vehicle interior space.

Yet another drawback of this approach is that the elements provided for the recovery of water can impair the aesthetic qualities of the vehicle.

Yet another drawback of this approach is that, in certain cases, water can stagnate in the water-recovery container, releasing an unpleasant odor.

3. GOALS OF THE INVENTION

The invention is aimed especially at overcoming the different drawbacks of these prior-art techniques.

More specifically, it is a goal of the invention in at least one particular embodiment to provide a technique for closing off a horizontal opening made in the body of a vehicle and provided with an aperture which can be uncovered by a movable glazed panel in which the means enabling the movable panel to be partially opened relative to the fixed portion take up less space than that the means implemented in the prior-art devices.

Another goal achieved through one variant of the invention is to render superfluous the implementation of a water recovery container around the aperture made in the fixed portion.

4. SUMMARY OF THE INVENTION

These goals as well as others that shall appear more clearly here below are achieved according to the invention by means of a device for closing off an opening or bay made in the body of a motor vehicle comprising:
- a fixed glazed portion designed to be fixedly attached to said vehicle, and
- a movable glazed panel capable of moving relative to the fixed portion between a closing-off position in which it closes off an aperture made in said fixed portion and at least one opening position in which said aperture is at least partially uncovered,
- device characterized in that the movable panel is mounted on a movable frame provided with tilting means to make the movable panel tilt relative to said movable frame.

According to the invention, the slight opening of the movable panel is obtained by causing the movable panel to tilt relative to its frame whereas in the prior art, it is the assembly constituted by the movable panel and its frame that tilt relative to the fixed portion, such an assembly having a space requirement and a weight that are greater than the movable panel alone.

Thus, the invention makes it possible to resort to tilting means that are less powerful and therefore take up less space than those implemented in the prior art.

According to one embodiment that is advantageous by its simplicity, said tilting means include at least one tie-rod linking the movable panel to the movable frame and capable of working with a sliding element mounted slidingly relative to the movable frame.

According to one particularly advantageous embodiment of the invention, the sliding element is capable of being driven in translation by means for putting the movable frame into motion relative to the fixed portion.

Such an embodiment makes it possible to command the tilting means with pre-existing means on which a novel function is thus conferred.

According to one particular embodiment, the means for putting the movable frame into motion include at least one arm mounted slidingly relative to the fixed portion and connected to the sliding element included in the tilting means which furthermore include means for holding the tie-rod in position that are to be deactivated only when the movable frame is in closing-off position.

Such a mode of implementation very naturally prompts the partial opening of the movable panel in simply lengthening the travel of the arm or arms that drive the movable frame in motion.

According to one variant of the invention, the movable frame is provided with tight-sealing means that are to be placed in contact with a periphery of the aperture defined in said fixed portion.

Tight-sealing means of this kind protect the fixed portion against possible water spraying which might occur when the movable panel is partially open.

According to one particularly advantageous embodiment of this variant, the movable frame is provided with means for recovering and draining off water, said means for recovering and draining off water comprising at least one water passage fixedly attached to the movable frame to enable the passage of said water from the movable frame to the exterior of the vehicle.

An embodiment of this kind enables water streaming down the movable panel to be drained off regularly and naturally, and is obtained through compact means which can easily be integrated into the very structure of the movable frame. In particular, in one embodiment where the movable frame is provided with guide pins sliding along two rails fixedly attached to the surface of said fixed portion, the means for recovering and draining off water comprise at least one passage formed on either side in one of the guide pins.

According to one particular aspect of the invention, said means for recovering and draining off water comprise at least one chute element formed by and/or fixedly attached to a frame of said movable panel.

A chute element of this kind which can, for example, take the form of a gutter in at least one particular embodiment of the invention, makes it possible to collect water on all or part of the contour of the movable glazed panel.

In at least one particularly advantageous embodiment of the invention, said chute element at least partially encroaches into the interior space of said vehicle facing said fixed portion.

Thus, the water streaming from the fixed portion through the aperture falls into the chute element, which enables it to be drained off. The chute element therefore fulfills an additional function of a sealing "barrier" protecting the vehicle interior space. Furthermore, in the closed-off position, if the sealing obtained is not perfect because for example of migration of water by capillarity, then the drops of flowing water can be collected in the chute element so that it can be drained off.

According to one variant of this mode of implementation, the chute element includes a gutter adjacent to the sealing means and connected to at least one passage of water prepared through said movable panel.

Such a gutter will enable the recovery of water which will be sprayed above the sealing means and further reinforce protection against untimely splashing.

The tight-sealing means may for example be seams or seals or any other appropriate deformable element making the aperture tightly sealed in the closed-off position whatever the weather conditions and/or conditions of use (drizzling, heavy rain, washing by means of a pressurized stream of water etc).

They can also be constituted in certain particular embodiments of the invention by a valve or any other appropriate hinged element, the state of which can be controlled, for example, by means for unlocking the movable panel.

Preferably, said movable panel has a rounded shape in at least two horizontal directions so as to make said water stream down towards at least one of its edges.

Thus, the water does not collect on the surface of the movable glass panel, thus preventing splashing in the interior space in the event of tremors and improving visibility through the movable panel.

The invention also concerns a motor vehicle equipped with one of the closing-off devices as described here above.

5. LIST OF FIGURES

Other features and advantages of the invention shall appear more clearly from the following description of a particular embodiment of the invention, given by way of a simple illustratory and non-exhaustive example, and from the appended drawings, of which:

6. DETAILED DESCRIPTION OF ONE EMBODIMENT OF THE INVENTION

6.1. Reminder of the Principle of the Invention

As mentioned here above, the general principle of the invention lies in the fact that the movable panel is capable of tilting relative to the movable frame, thus making it possible to make use, to this effect, of tilting means which are more compact than those used in the prior art to obtain the tilting of a movable assembly that includes both the movable frame and the movable panel.

In at least one embodiment of the invention, tight-sealing means designed to be placed in contact with the periphery of the aperture defined in said fixed portion furthermore enable the fixed portion to be protected from possible spraying of water that might occur when the movable panel is partially open.

6.2. Examples of Embodiments of the Invention

Figure 1:
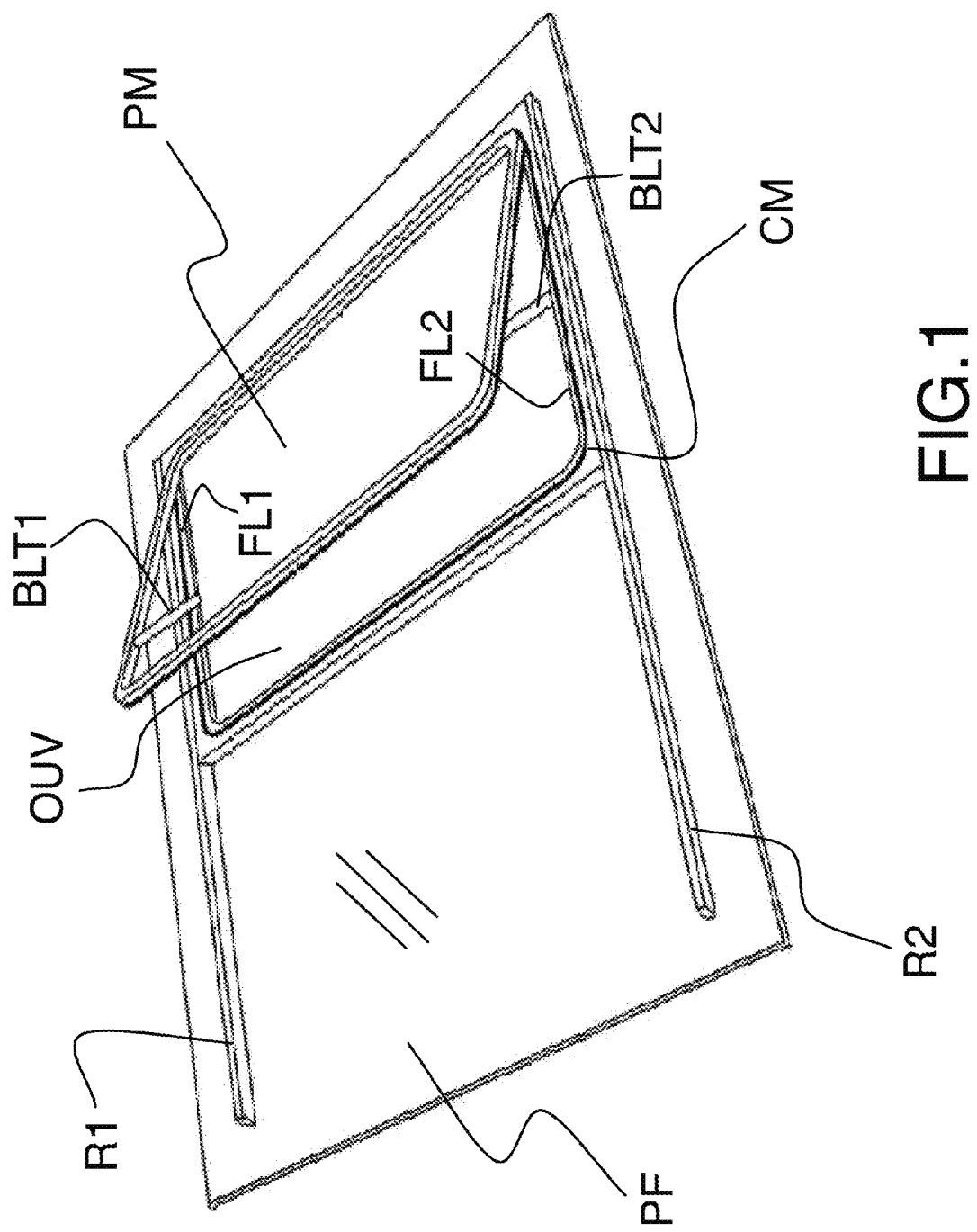
FIG. 1 is an illustration, in a top view in perspective, of one embodiment of a closing-off device according to the invention forming a roof of a vehicle in a partially open position.

FIG. 1 represents a device for closing off an opening made in the body of a motor vehicle comprising:
- a fixed glazed portion PF designed to be fixedly attached to said vehicle, and
- a movable glazed panel PM capable of moving relative to the fixed portion PF between a closing-off position, in which it closes off an aperture OUV made in said fixed portion and at least one opening position in which said aperture is at least partially uncovered.

In a known way, in order to uncover the aperture OUV, the movable frame CM is capable of being shifted towards the rear of the vehicle by sliding in the rails R1 and R2 fixedly attached to the fixed portion PF and situated on either side of said movable frame CM herein visible transparently through the fixed portion PF.

The device according to the invention is remarkable in that the movable panel PM is mounted on a movable frame CM, which is provided with tilting means to make the movable panel PM tilt relative to said movable frame CM. These tilting means herein include a first and second tie-rod BLT1 and BLT2 respectively linked to first and second internal lateral faces FL1 and FL2 of the movable frame CM by pivot links.

According to the invention, the slight opening of the movable panel PM is obtained by causing the movable panel PM to tilt relative to its frame CM whereas in the prior art it is the assembly constituted by the movable panel PM and its frame CM that tilts relative to the fixed portion PM, an assembly of this kind having a space requirement and a weight that are greater than those of the movable panel PM alone.

FIGS. 2A to 2E are views in section of a closing-off device according to the invention in various possible configurations.

Figure 2:
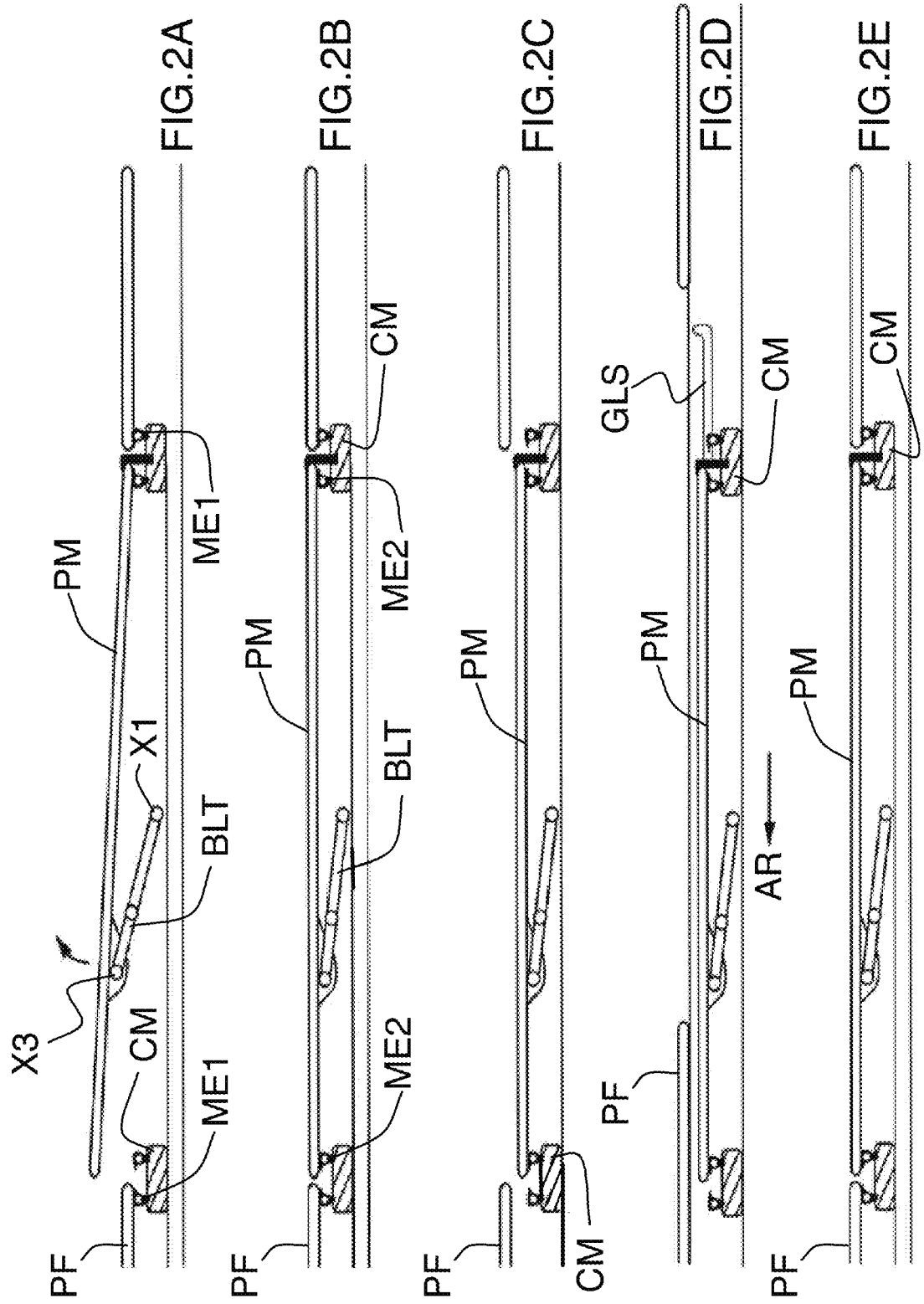
FIGS. 2A to 2E represent views in section of a closing-off device according to the invention in different possible configurations.

FIG. 2A shows a closing-off device in which the movable panel PM is in a partially open position relative to the movable frame CM, itself in a position of closing off the aperture made in the fixed panel PF.

The slight opening of the movable panel PM is obtained by conveying, to a tie-rod BLT included in the tilting means, a motion of rotation around a shaft X1, said tie-rod BLT being furthermore mounted so as to be pivoting around a shaft X3 relative to the movable panel PM.

In this embodiment of the invention, the movable frame CM is provided with first tight-sealing means ME1 designed to be placed in contact with a periphery of the aperture defined in said fixed portion PF.

These tight-sealing means ME1 enable the fixed portion PF and especially the mechanisms for putting the movable frame CM into motion to be protected against possible spraying of water that might occur when the movable panel PM is partially open.

FIG. 2B shows the closing-off device when the movable panel PM is in a closed position relative to the movable frame CM which is itself in a position of closing off the aperture made in the fixed panel PF.

In this position, the movable panel PM is placed against second tight-sealing means ME2 positioned on an interior contour of the movable frame CM and the aperture made in the fixed portion PF is then entirely closed.

FIG. 2C shows the closing-off device when, with the movable panel PM being in the closed position relative to the movable frame CM, the movable frame initiates a motion relative to the fixed panel PF in order to uncover the aperture made in the fixed panel PF.

To this end, the movable frame is thus in a first stage driven in motion towards the base so that it can then be retracted beneath the fixed portion PF.

FIG. 2D shows the closing-off device when, with the movable frame CM being no longer coplanar with a fixed panel PF, said movable frame initiates a motion of translation towards the rear AR of the vehicle by sliding within slideways GLS prepared in rails situated on either side of the movable frame in order to uncover the aperture made in the fixed panel PF.

FIG. 2E shows the closing-off device after the movable frame CM has returned to the position of closing off the aperture made in the fixed panel PF, the movable panel PM being still in a closed position relative to the movable frame CM.

Figure 3:
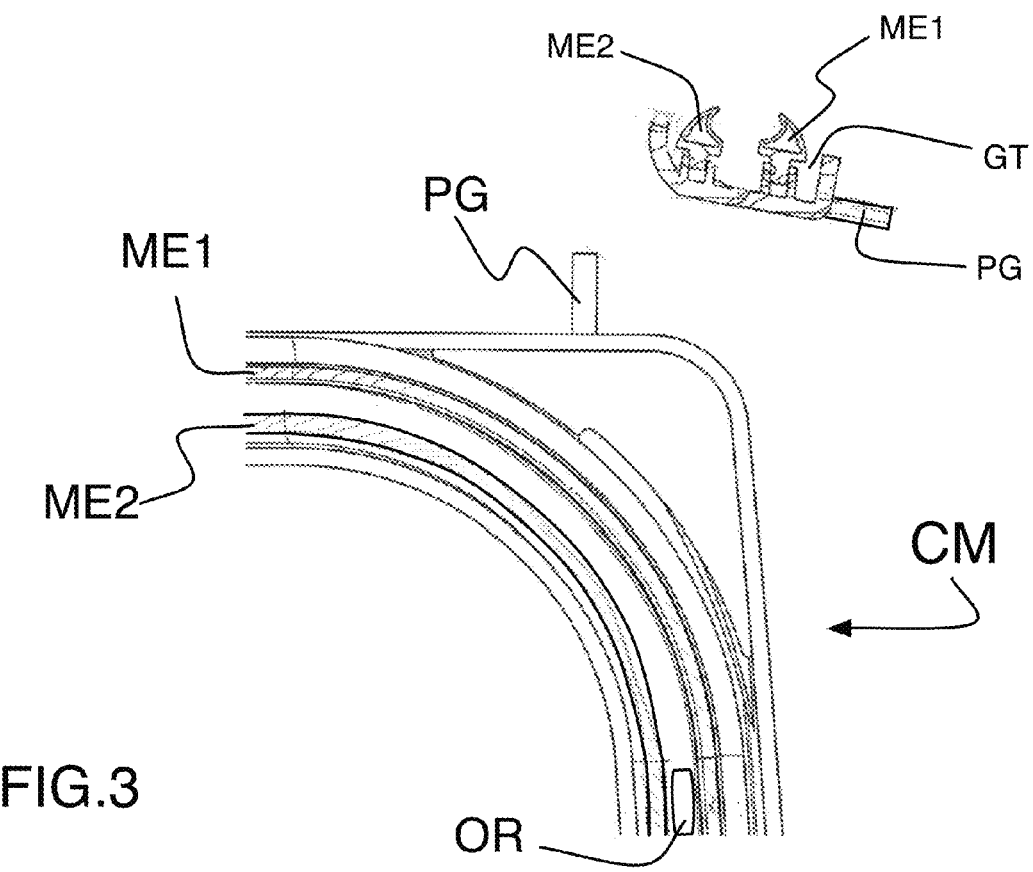
FIG. 3 is a partial top view at the level of a guide pin of a movable frame included in a closing-off device according to the invention.

FIG. 3 shows a top view of a portion of the movable frame CM which is provided with first tight-sealing means ME1 intended for being placed in contact with a periphery of the aperture defined in the fixed portion and second tight-sealing means ME2 intended for being placed in contact with a periphery of the lower surface of the movable panel.

These tight-sealing means ME1 and ME2 can for example be seams or seals or any other suitable deformable element making the aperture tightly sealed in the closed-off position whatever the weather conditions and/or conditions of use (drizzle, heavy rain, washing with a pressurized stream, etc).

In certain alternative embodiments, these tight-sealing means ME1 and ME2 could also consist of a valve or any other appropriate hinged element, the state of which can be controlled for example by means for unlocking the movable panel.

In the particular embodiment represented herein, the movable frame CM is provided with means for recovering and draining off water, said means for recovering and draining off water comprising a water passage connected to a run-off orifice OR for water collected in the space between the first and second tight-sealing means ME1 and ME2.

Furthermore, since the movable frame CM is provided with guide pins PG capable of guiding the movable frame CM slidingly along two rails fixedly attached to the surface of said fixed portion, the means for recovering and draining off water comprise a passage formed on either side in one of the guide pins connected to at least one run-off orifice OR.

In this particular embodiment, said means for recovering and draining off water further comprise at least one chute element, of which a portion GT takes the form of a gutter and at least partially encroaches into the interior space of said vehicle facing said fixed portion, the chute element being connected to at least one water passage prepared through said movable panel.

Thus, any water that would stream from the fixed portion through the aperture and fall into the chute element could be easily drained off. The chute element therefore fulfills an additional function of a tightly sealing "barrier" protecting the vehicle interior space. Furthermore, in the closed-off position, if the sealing obtained is not perfect, for example because of migration of water by capillarity, the drops of flowing water can be collected in the chute element in order to be drained off.

Figure 4:
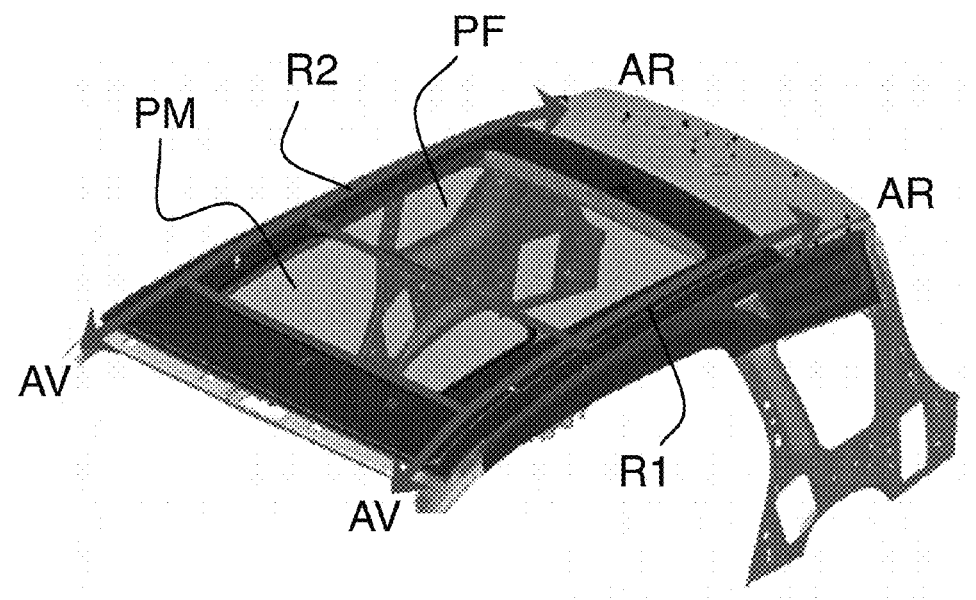
FIG. 4 is a partial view in perspective of a vehicle including a closing-off device according to the invention.

FIG. 4 illustrates the flow of the water collected in the recovering and draining-off means described here above. Since the movable panel PM is herein slightly domed, water on its surface would naturally stream towards its edges and be collected there either between the first and second tight-sealing means or in the chute element made on the external contour of the movable frame. Thus, as described here above, this water will be drained off for example through guide pins towards the rails in which the movable frame is to slide, these rails being connected to apertures made in the front AV and the rear AR of the vehicle.

Figure 5A:
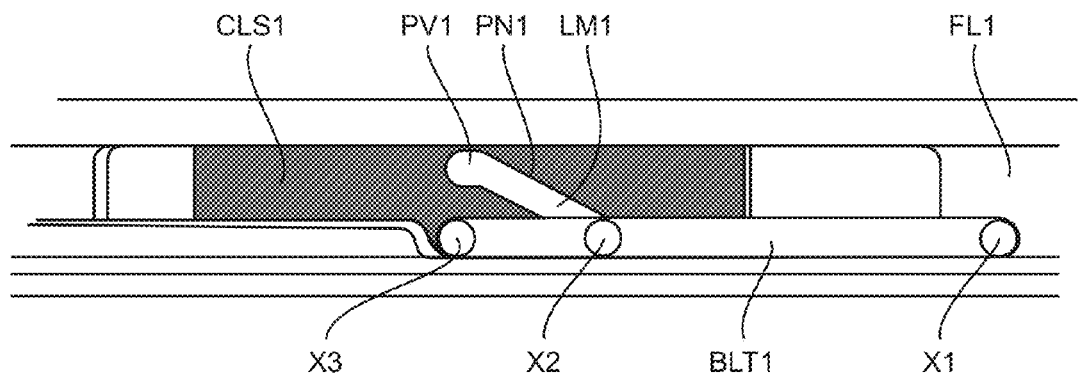
FIGS. 5A to 5C are views in perspective of tilting means according to one particular mode of implementing the invention, in three successive positions.
Figure 5B:
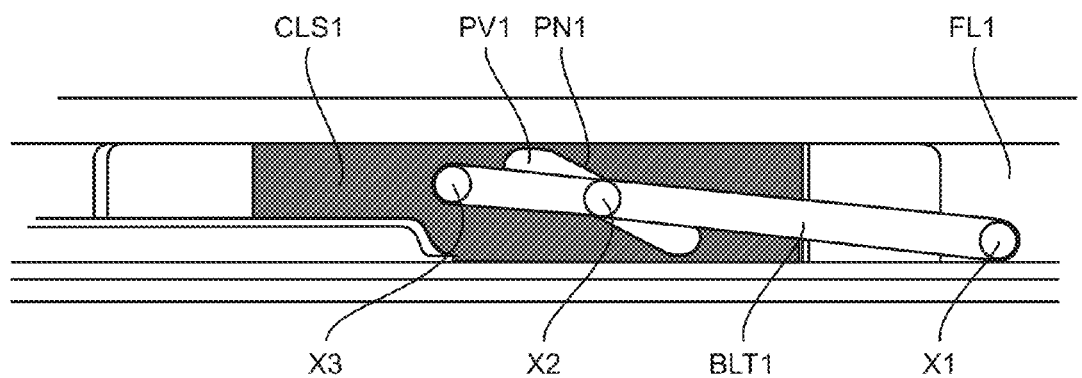
Figure 5C:
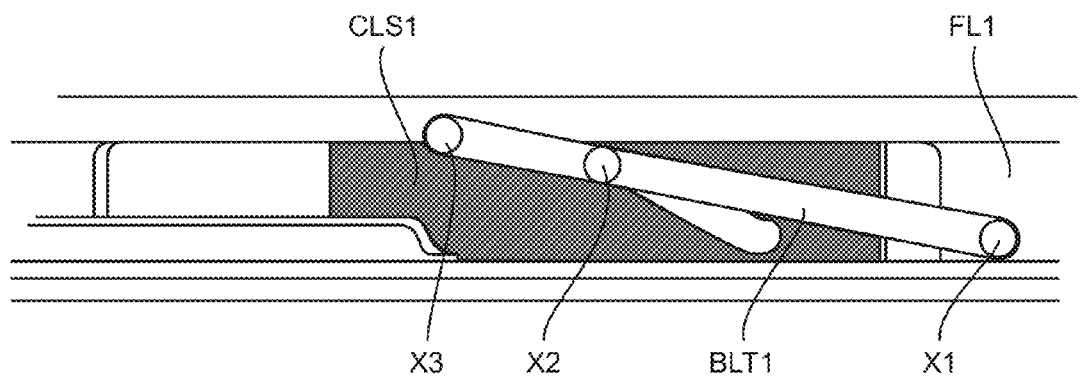

FIGS. 5A to 5C give a more detailed view of the tilting means enabling the movable panel to be partially opened relative to the fixed panel according to one embodiment. These tilting means include a sliding element CLS1 moving along the rail RI. A tie-rod BLT1 enables the slight opening of the movable panel to be checked. One end of this tie-rod is connected to an internal lateral flank FL1 of the movable frame CM through a pivotal link around a shaft X1 and another end is intended to be linked to the movable panel by means of a shaft X3 capable of sliding in a lateral upright of said movable panel. The tie-rod BLT1 is furthermore connected at an intermediate point to the sliding element CLS1 by means of an intermediate shaft X2 fixedly linked to the tie-rod BLT1 and capable of moving in a slot LM1 made in the sliding element CLS1, this slot LM1 having a slope PN1 leading to a locking position PV1 in which the intermediate shaft X2 will be immobilized heightwise.

The tilting means furthermore include means for holding the tie-rod BLT1 in position, these means being intended for being deactivated only when the movable frame CM is in a closing-off position.

Thus, so long as the movable frame CM is not in a closing-off position (FIG. 5A), the rod BLT1 remains in a horizontal position and moves along the rail at the same time as the sliding element CLS1. However, when the movable frame CM is in a closing-off position, the movable frame CM and hence its lateral flank FL1 and the shaft X1 which it bears are immobilized. The further shifting of the sliding element along the flank FL1 towards the front of the vehicle, i.e. from left to right in the present figure, will prompt a rising of the intermediate shaft X2 of the tie-rod BLT1 along the slope PN1 of the slot LM1 (FIG. 5B) until said intermediate shaft X2 reaches a stop in the locked position PV1 which corresponds to a substantially horizontal end portion of the slot LM1 (FIG. 5C).

This movement of the intermediate shaft X2 in the slot LM1 also leads to the shifting of the shaft X3 and hence to the slight opening of the movable frame CM until it reaches the stable partially open position defined by the position PV1.

Only a thrust conveyed to the sliding element towards the rear of the vehicle, i.e. from right to left in the present figure, could then prompt a descent of the intermediate shaft X2 of the tie-rod BLT1 along the slope PN1 of the slot LM1 which could continue until the tie-rod BLT1 has recovered its horizontal position. The movable frame CM then returns to its closing-off position.

Figure 6:
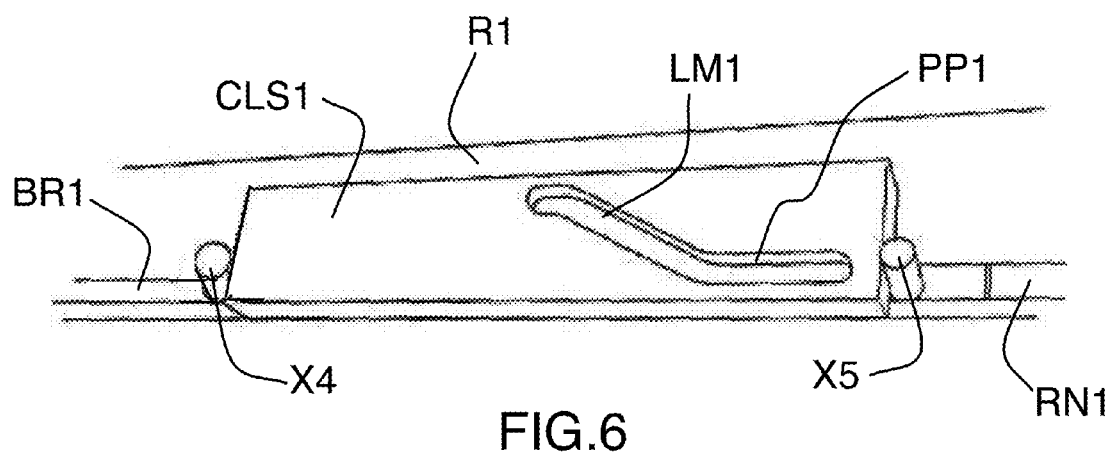
FIGS. 6 and 7 illustrate two possible modes of linking between the tilting means and the means for putting the movable frame into motion.

FIG. 6 illustrates a view in perspective of one possible embodiment of the means for putting the sliding element CLS1 into motion, these means including at least one arm BR1 mounted slidingly in a groove RN 1 made in the rail R1 which is itself fixedly attached to the fixed portion. This arm BR1 is linked to a skid which has two studs X4 and X5 which are positioned on either side of the sliding element CLS1 and thus ensure the driving in translation of this sliding element CLS1. An electronic stop element will advantageously be made to define a position of the arm BR1 in which the movable frame CM is in the closing-off position without the arm BR1 itself being in the position of maximum frontward extension. The present figure illustrates a possible embodiment of the locking means of the means holding the tie-rod BLT1 in position, these means being shown herein by a horizontal extension PP1 of the slot LM1 in which the intermediate shaft X2 will be held so long as the movable frame CM is not in a closing-off position and so long as an additional extension of the arm BR1 prompts a rising of the intermediate shaft X2 along the slope of the slot LM1.

Figure 7:
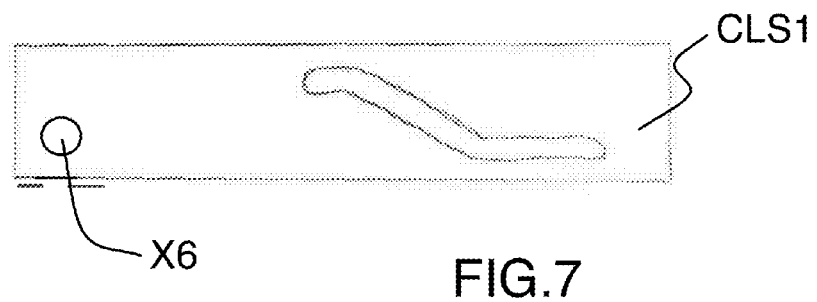

FIG. 7 illustrates another possible embodiment of means for putting the slide CLS1 into motion, including a single shaft X6 crossing said sliding element CLS1 and fixedly attached to the skid described in the previous figure.

Figure 8:
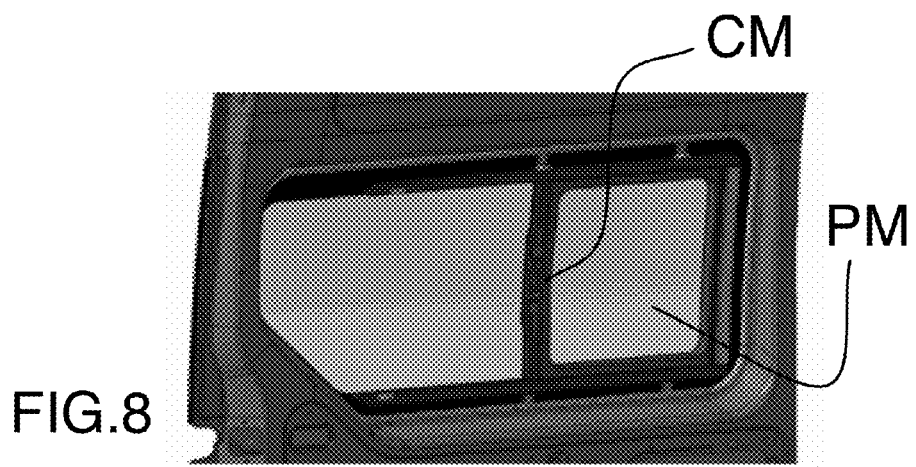
FIG. 8 is a view in perspective of another closing-off device according to the invention, implemented within a lateral glazed opening.

FIG. 8 is a view in perspective, which illustrates another type of closing-off device according to the invention implemented within a lateral glazed opening. This device comprises an essentially vertical fixed portion PF, a frame CM which is also essentially vertical and movable in an essentially horizontal direction relative to the fixed portion PF. This device furthermore includes a movable panel PM fixedly attached to the movable frame CM but capable of tilting relative to this movable frame. In the present figure, the movable panel PM is held against the movable frame CM.

Figure 9:
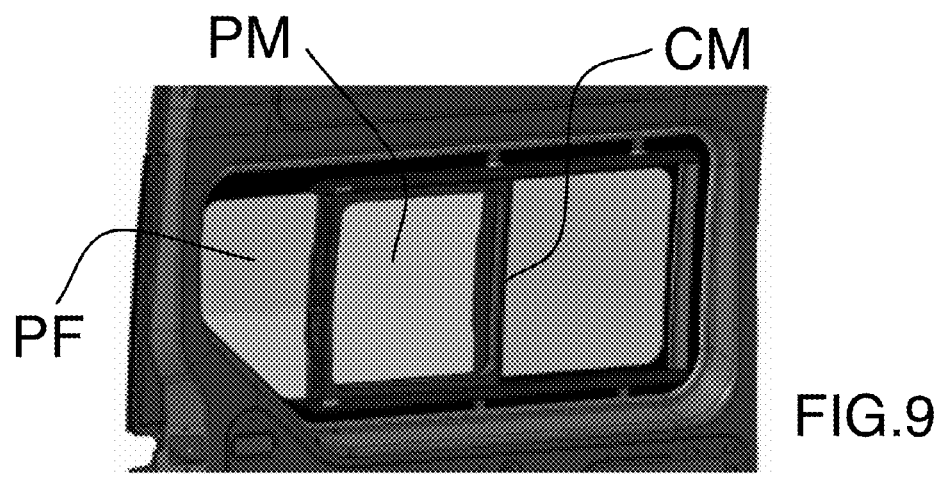
FIG. 9 shows a closing-off device of this kind in an open position.
Figure 10:
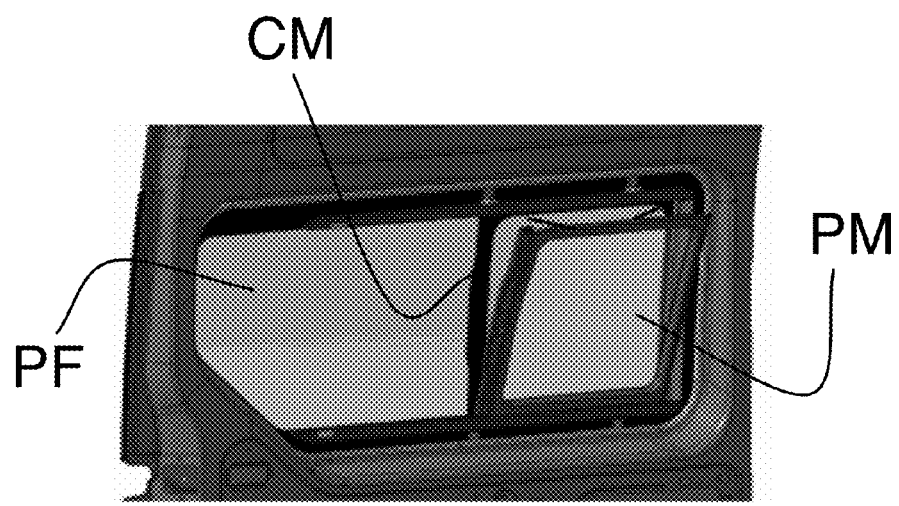
FIGS. 10 to 13 represent a device of this kind, the movable frame of which is in a closing-off position, the movable panel therein being represented in various possible tilting positions.
Figure 11:
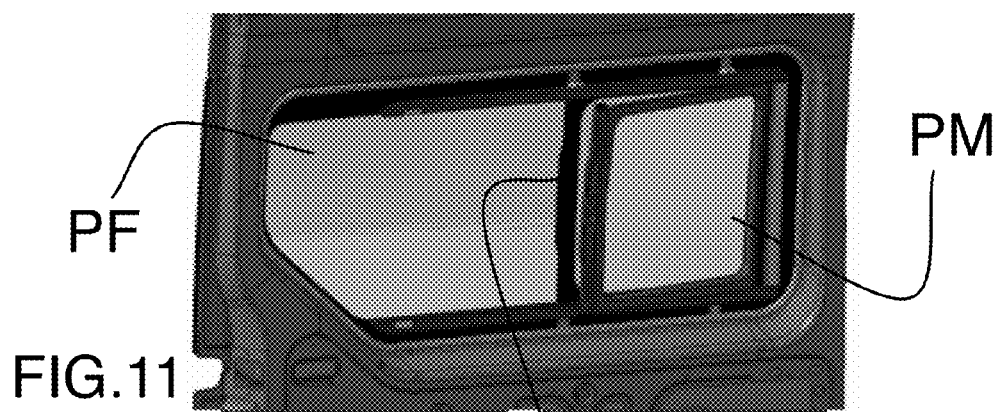
Figure 12:
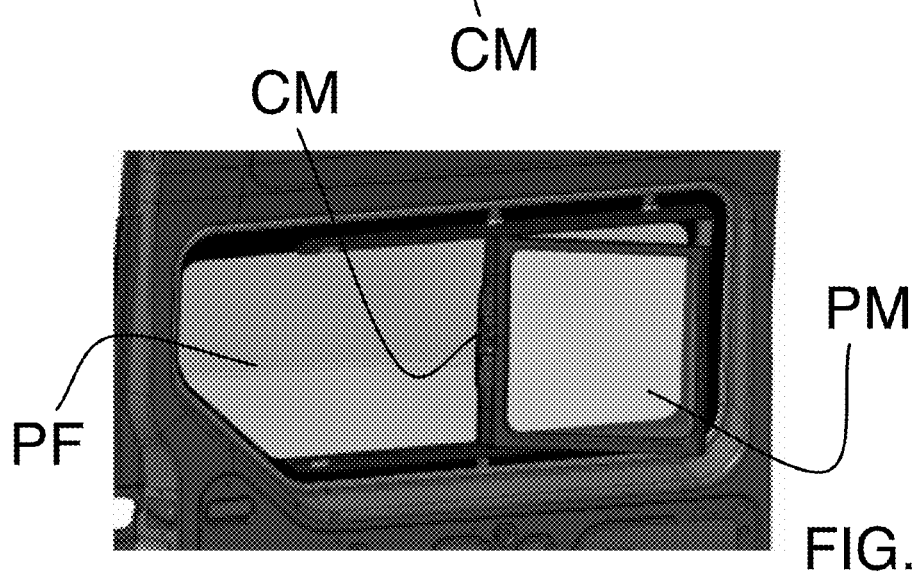
Figure 13:
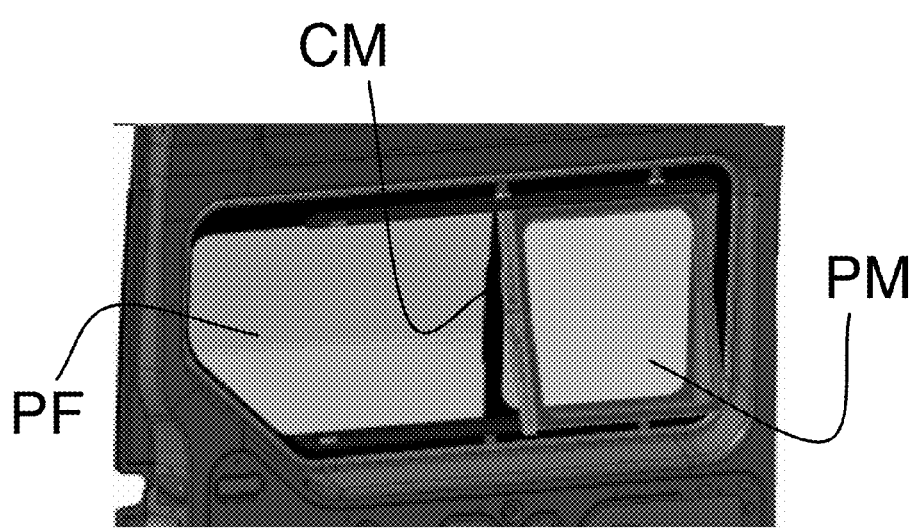

FIG. 9 shows a closing-off device of this kind in a totally open position in which the movable panel PM is held against the movable frame CM which is retracted behind the fixed portion PF of the bay, i.e. within the vehicle.

The FIGS. 10 to 13 show a closing-off device of this kind, of which the movable frame CM is in the closing-off position, the movable panel being represented therein in various possible tilting positions. If, in these examples, the layout of the movable panel PM relative to the fixed frame CM is such that the tilting of the movable panel PM occurs inside the vehicle. Another layout could be chosen so that the tilting of the movable panel PM occurs outside the vehicle.

The invention claimed is:

1. A device for closing off an opening made in a body of a motor vehicle, the device comprising:
   a fixed glazed portion configured to be fixedly attached to said vehicle;
   a movable glazed panel configured to move relative to said fixed glazed portion between a closing-off position and an upwardly tilting position,
      wherein at said closing-off position, said movable glazed panel closes off an aperture made in said fixed glazed portion, and
      at said upwardly tilting position, said aperture is at least partially uncovered,
   wherein said movable glazed panel is mounted on a movable frame provided with tilting means configured to allow said movable glazed panel to tilt relative to said movable frame, said tilting means comprising:
      a sliding element including a slot, said sliding element mounted slidingly relative to said movable frame,
      a tie-rod pivotably connected to said movable glazed panel and pivotably connected to said movable frame so that said tie-rod pivots to move said movable glazed panel between said closing-off position and said upwardly tilting position,
         wherein said tie rod is configured to cooperate with said sliding element, and
      a shaft fixed to said tie-rod and configured to move in said slot in said sliding element.

2. The device for closing off according to claim 1, wherein said sliding element is capable of being driven in translation by means for putting said movable frame into motion relative to said fixed glazed portion.

3. The device for closing off according to claim 2, wherein said means for putting said movable frame into motion include at least one arm mounted slidingly relative to said fixed glazed portion and connected to said sliding element included in said tilting means, wherein said tilting means include means for holding said tie-rod in position that are to be deactivated only when said movable frame is in closing-off position.

4. The device for closing off according to claim 1, wherein said movable frame is provided with tight-sealing means that are to be placed in contact with a periphery of the aperture defined in said fixed portion.

5. The device for closing off according to claim 4, wherein said movable frame is provided with means for recovering and draining off water, said means for recovering and draining off water comprising at least one water passage fixedly attached to said movable frame to enable the passage of said water from said movable frame to said exterior of said vehicle.

6. The device for closing off according to claim 5, wherein, said movable frame being provided with guide pins placed slidingly along two rails fixedly attached to the surface of said fixed portion, said means for recovering and draining off water comprise at least one passage formed on either side in one of said guide pins.

7. A motor vehicle, comprising:
   at least one closing-off device attached to a body of said motor vehicle to close off an opening, said closing-off device comprising:
      a fixed glazed portion configured to be fixedly attached to said vehicle;
      a movable glazed panel configured to move relative to said fixed glazed portion between a closing-off position and an upwardly tilting position,
         wherein at said closing-off position, said movable glazed panel closes off an aperture made in said fixed glazed portion, and
         at said upwardly tilting position, said aperture is at least partially uncovered,
      wherein said movable glazed panel is mounted on a movable frame provided with tilting means configured to allow said movable glazed panel to tilt relative to said movable frame, said tilting means comprising;
         a sliding element including a slot, said sliding element mounted slidingly relative to said movable frame,
         a tie-rod pivotably connected to said movable glazed panel and pivotably connected to said movable frame so that said tie-rod pivots to move said movable glazed panel between said closing-off position and said upwardly tilting position,
         wherein said tie rod is configured to cooperate with said sliding element, and
         a shaft fixed to said tie-rod and configured to move in said slot in said sliding element.

* * * * *